United States Patent
Grimanis et al.

(10) Patent No.: US 6,386,548 B1
(45) Date of Patent: May 14, 2002

(54) DUAL SEAL ASSEMBLY

(75) Inventors: Michael P. Grimanis, Wayland; Mark W. Stremeckus, Haverhill, both of MA (US)

(73) Assignee: A. W. Chesterton Company, Stoneham, MA (US)

( * ) Notice: Subject to any disclaimer, the term of this patent is extended or adjusted under 35 U.S.C. 154(b) by 0 days.

(21) Appl. No.: 09/365,969

(22) Filed: Aug. 2, 1999

Related U.S. Application Data

(60) Provisional application No. 60/105,818, filed on Oct. 27, 1998.

(51) Int. Cl.[7] .............................................. F16J 15/34
(52) U.S. Cl. ...................... 277/584; 277/436; 277/440; 277/497
(58) Field of Search ................................ 277/584, 436, 277/437, 440, 496, 497

(56) References Cited

U.S. PATENT DOCUMENTS

| | | | | |
|---|---|---|---|---|
| 3,848,880 A | * | 11/1974 | Tanner ........................ | 277/584 |
| 4,398,731 A | * | 8/1983 | Gorman et al. ............. | 277/436 |
| 4,533,149 A | * | 8/1985 | Vater et al. .................. | 277/584 |
| 4,635,945 A | | 1/1987 | Beck .......................... | 227/124 |
| 5,082,295 A | | 1/1992 | Wetzel ....................... | 277/165 |
| 5,149,107 A | | 9/1992 | Maringer et al. ........... | 277/165 |
| 5,303,935 A | | 4/1994 | Saksun ...................... | 277/152 |
| 5,337,840 A | | 8/1994 | Chancey ..................... | 175/107 |
| 5,346,230 A | | 9/1994 | Schumacher et al. ....... | 277/152 |
| 5,695,201 A | | 12/1997 | Wheeler ..................... | 277/205 |

FOREIGN PATENT DOCUMENTS

| | | |
|---|---|---|
| EP | 431325 | 10/1993 |
| EP | 573539 | 5/1995 |
| EP | 502409 | 5/1997 |
| GB | 1598347 | 9/1981 |

* cited by examiner

*Primary Examiner*—Chuck Y. Mah
*Assistant Examiner*—Enoch Peavey
(74) *Attorney, Agent, or Firm*—Lahive & Cockfield, LLP

(57) ABSTRACT

A dual seal assembly for providing a seal between a reciprocating rod and the gland is described. The dual seal includes first and second axially adjacent annular seal elements. The first seal element is constructed of a material having a different hardness than the material forming the second seal element. The first and second seal elements each include a seal edge contacting the rod to provide a respective seal between the first and second seal element and the rod. At least a portion of one of the first seal element and the second seal element engages the gland to form the seal between the rod and the gland. By varying the hardness of the materials forming the seal elements, the first seal element and the second seal element can be configured to provide different functions within the dual seal assembly and can cooperatively provide an effective fluid seal under a wide range of operating conditions. In an alternative embodiment, the components of the dual seal assembly are split to facilitate installation, replacement, monitoring, or inspection of the dual seal assembly. The seal elements of the seal are split at an interface to form first and second interconnecting edges that interlock to inhibit separation of the seal elements at the interface.

28 Claims, 8 Drawing Sheets

DUAL SEAL ASSEMBLY

REFERENCE TO RELATED APPLICATIONS

This application claims priority to U.S. Provisional Application No. 60/105,818, filed on Oct. 27, 1998, which is incorporated herein by reference.

BACKGROUND OF THE INVENTION

The present invention relates to a seal assembly for sealing a rod or shaft relative to a gland or housing surrounding the rod. In particular, the invention relates to a split dual seal assembly for providing a seal between a rod and the gland.

Hydraulic and pneumatic systems usually convert fluid pressure to a linear force by applying the fluid pressure to one end of a cylindrical piston which slides axially in a mating bore. A piston rod extends from the piston or shaft out through at least one end of the bore and into a gland or housing. To avoid a loss of fluid and fluid pressure from the systems, a sealing system is necessary to provide a seal between the rod and the gland or housing and/or between the piston and the bore.

Conventional sealing systems can employ a number of annular elastomeric sealing elements disposed within a groove formed in the gland. The annular sealing elements are sized to provide interference between the sealing elements and the outer surface of the rod. The degree of interference provided preferably allows smooth axial movement of the rod through the sealing elements while concomitantly providing fluid sealing between the rod and the gland.

Such conventional sealing systems suffer from a number of deficiencies. In particular, the reciprocating movement of the rod can cause the seal elements to extrude through the clearance gap provided between the rod and the gland. In addition, as the seal elements wear, the amount of radial compressive force provided by the seal elements against the rod decreases, resulting in a corresponding decrease in the sealing effectiveness of the sealing elements. To compensate for such a decrease in the sealing efficacy, a number of conventional sealing systems provide an axial compression mechanism to adjust the axial pressure on the seal elements, thereby increasing the radial compressive force provided by the seal elements against the rod. Such occasional adjustments can be time-consuming and can increase the cost of maintenance.

In order to overcome the wear problem associated with elastomeric seal elements, some conventional sealing systems include an additional elastomeric positioning element to place the seal elements into sealing contact with the rod by exerting axial and/or radial compressive forces against the seal elements. Such conventional sealing systems, however, typically do not function properly in all operating conditions. For example, in pressure-reversal conditions in which the pressure in the normally high-pressure side of the hydraulic or pneumatic system drops below the pressure in the normally low-pressure side of the system, the additional elastomeric positioning element can be ineffective for placing the sealing elements into contact with the outer surface of the rod.

Further, in such sealing systems, the additional positioning element does not contact the rod, and thus, provides no sealing function. Since only the sealing elements contact the rod, there is no cooperative effect between the sealing elements and the positioning element for ensuring that the concentricity of the seal is maintained. Loss of concentricity can lead to leakage of fluid or gas. For example, in many applications, the rod can be subjected to radial forces that tend to distort concentric alignment of the rod. Such a distortion of the alignment of the rod can in turn distort the sealing surfaces that contact the rod, thereby causing the sealing edges of the seal elements to lose sealing engagement with the rod.

Another drawback of the prior art sealing system is the poor wear characteristics of the seal elements necessitate frequent monitoring and replacement or adjustment of the seal elements. Replacement and installation of the seal elements or other components of the seal system can require the complete breakdown of the hydraulic or pneumatic system to pass the annular components over the rod. The replacement and adjustment process can thus require frequent long periods of down time for the system associated with the seal system.

It is thus an object of the invention to provide a seal assembly having seal elements that maintain sealing contact with the rod throughout a wide range of operating conditions including pressure-reversal conditions.

It is another object of the invention to provide a seal assembly having seal elements that maintain sealing engagement with the rod without necessitating frequent monitoring, replacement, or adjustment of the seal assembly.

It is yet another object of the invention to provide a seal assembly having seal elements that resist extrusion into the clearance gap between the rod and the gland.

It is further another object of the invention to provide a seal assembly having split components that facilitate monitoring, installation and replacement of the seal assembly.

Other and more specific objects of this invention will in part be obvious and in part be evident from the drawings and description which follow.

SUMMARY OF THE INVENTION

These and other objects of the present invention are achieved by the dual seal assembly of the present invention for providing a seal between a reciprocating rod and the gland. The dual seal includes first and second axially adjacent annular seal elements. The first seal element is constructed of a material having a different hardness than the material forming the second seal element. The first and second seal elements each include a seal edge contacting the rod to provide a respective seal between the first and second seal elements and the rod. At least a portion of the first seal element and/or the second seal element engages the gland to form the seal between the rod and the gland.

In accordance with one aspect of the present invention, the first seal element is positioned axially inward from the second seal element and the hardness of the material forming the first seal element is less than the hardness of the material forming the second seal element. Preferably, the durometer hardness of the material forming the second seal element is approximately between 50 Shore A and 25 Shore D and the durometer hardness of the material forming the first seal element is approximately between 50 Shore A and 95 Shore A.

The difference in hardness of the materials forming the first and second seal elements provides a number of significant advantages. By varying the hardness of the materials forming the seal elements, the first seal element and the second seal element can be configured to provide different functions within the dual seal assembly and can cooperatively provide an effective fluid seal under a wide range of operating conditions. For example, the lower durometer hardness material forming the first seal element allows increased elastic radial deflection of the first seal element when the first seal element is axially compressed by fluid pressure during operation. The first seal element, thus, can translate axial compressive forces into an increased radial sealing force by radially deflecting in the direction of the rod and in the direction of the groove. Conversely, the increased durometer hardness of the second seal element allows the second seal element to resist elastic deformation during operation thereby maintaining the concentricity of the softer first seal element, inhibiting extrusion of the first seal element into the clearance gap between the rod and the gland, and allowing the dual seal to operate under reverse pressure conditions.

In accordance with an alternative embodiment of the present invention, at least one of the components of the dual seal assembly is split to facilitate installation, replacement, monitoring, or inspection of the dual seal assembly. In particular, the installation, replacement, and inspection of the split seal component of the dual seal assembly can be performed without necessitating the complete breakdown of the hydraulic and pneumatic system and without having to pass the seal component over an end of the rod. Preferably, the first annular seal element is split at an interface to form first and second interconnecting edges that interlock to inhibit separating of the seal element at the interface.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION OF THE PREFERRED EMBODIMENTS

Figure 1:
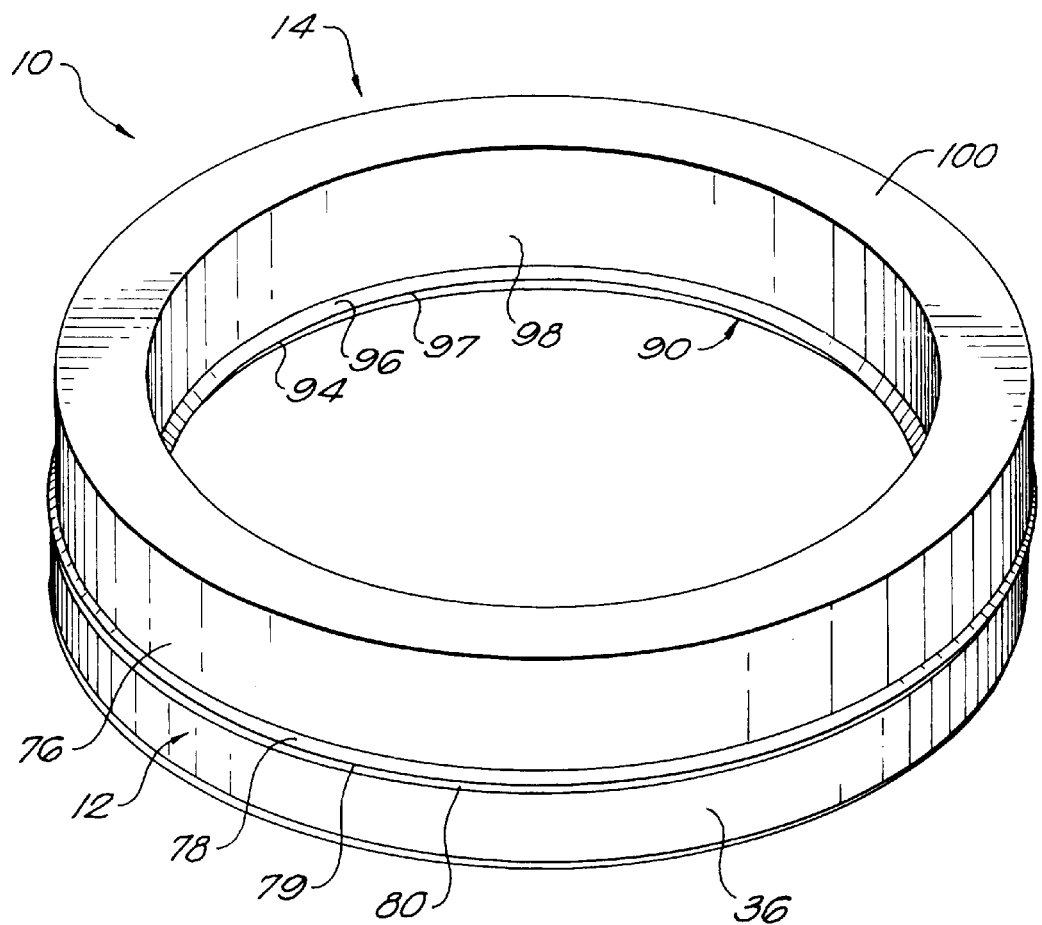
FIG. 1 is a perspective view of a dual seal assembly according to the teachings of the invention.
Figure 1A:
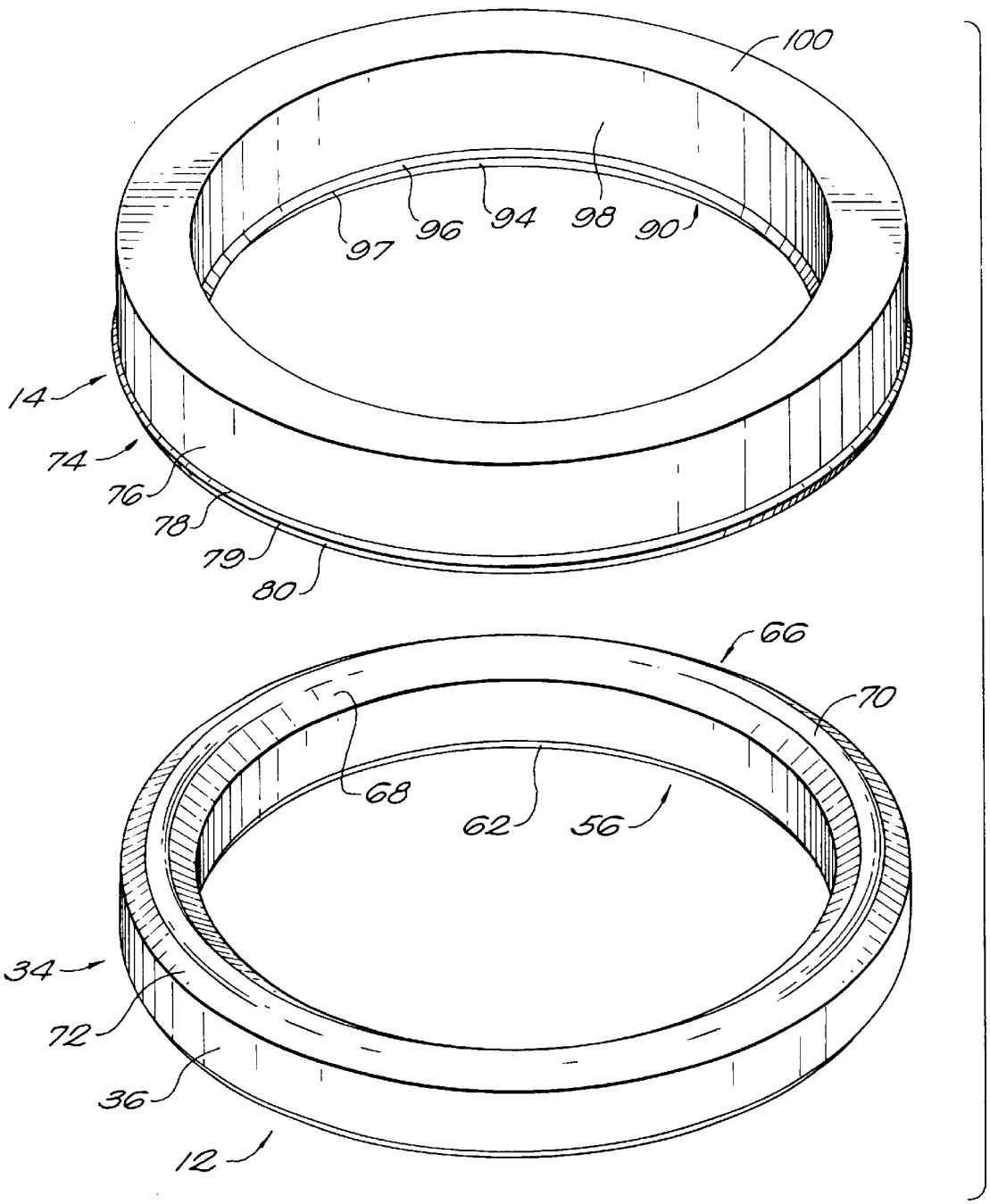
FIG. 1A is an exploded perspective view of the dual seal assembly of FIG. 1.
Figure 1B:
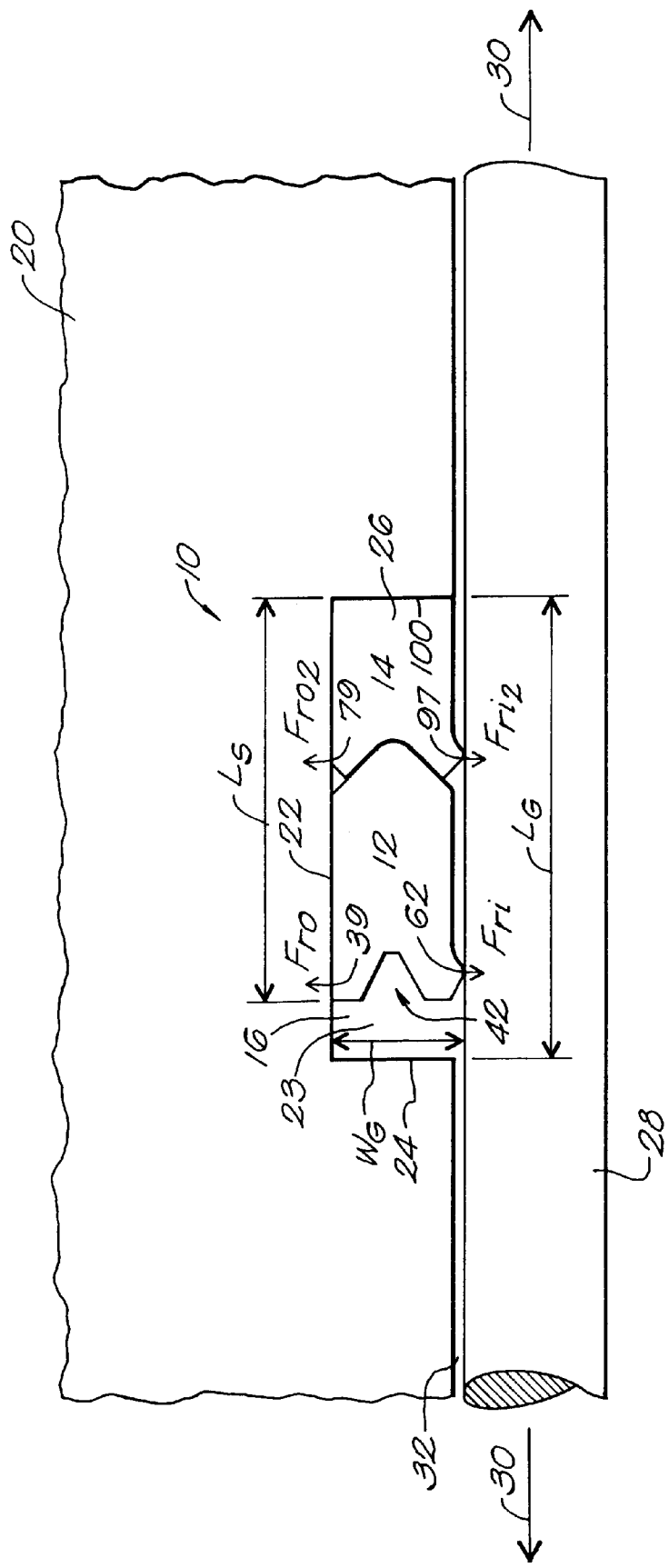
FIG. 1B is a fragmentary view in cross-section of the dual seal assembly of FIG. 1, illustrating the dual seal assembly under static operating conditions.

An exemplary embodiment of a dual seal assembly 10 in accordance with the teachings of the present invention is illustrated in FIGS. 1, 1A and 1B. The seal assembly 10 is preferably concentrically disposed about a shaft or a rod 28 and is seated within an annular groove 16 formed within a gland or housing 20 associated with a hydraulic or pneumatic system. The rod 28 extends along an axis 30, and is partially mounted within the gland 20. During operation of the hydraulic/pneumatic system, the rod 28 reciprocates along the axis 30 relative to the gland 20. The dual seal assembly 10 is constructed to provide fluid sealing between the gland 20 and the rod 28, thereby preventing hydraulic or pneumatic fluid from leaking from the hydraulic/pneumatic system. Sealing is provided primarily by a first annular seal element 12 having an annular sealing surface 62 that engages the rod 28 to establish the primary fluid seal of the seal assembly 10. A second annular seal element 14 axially interconnects with the first seal element 12 to maintain the first seal element 12 within the groove 16 and in engagement with the rod 28. As described in greater detail below, the second seal element 14 engages the rod 28 to provide secondary fluid sealing against the rod 28. When seated within the groove 16 of the gland 20, the first and second annular seal elements 12 and 14 are radially biased into sealing engagement with the rod 28 under a wide range of operation conditions, as described in greater detail below.

The terms "axial" and "axially" used herein refer to a direction generally parallel to the rod axis 30. The terms "radial" and "radially" used herein refer to a direction generally perpendicular to the rod axis 30. The terms "fluid" and "fluids" refer to liquids, gases, and combinations thereof.

Continuing to refer to FIG. 1, the annular groove 16 formed within the gland 20 includes an axially extending surface 22 and two spaced-apart, radially extending side walls 24 and 26. An annular clearance gap 32 separates the gland 20 from the rod 28 at the axially outer end of the gland 20. An analogous annular clearance gap 33 separates the gland 20 from the rod 28 at the axially inner end of the gland 20. The clearance gaps 32 and 33 are provided to allow the rod 28 to reciprocate without interference from the gland 20. The term "axially inner" as used herein refers to the portion of the gland 20 proximate the hydraulic/pneumatic system. Conversely, the term "axially outer" as used herein refers to the portion of the gland 20 distal from the hydraulic/pneumatic system.

Figure 2:
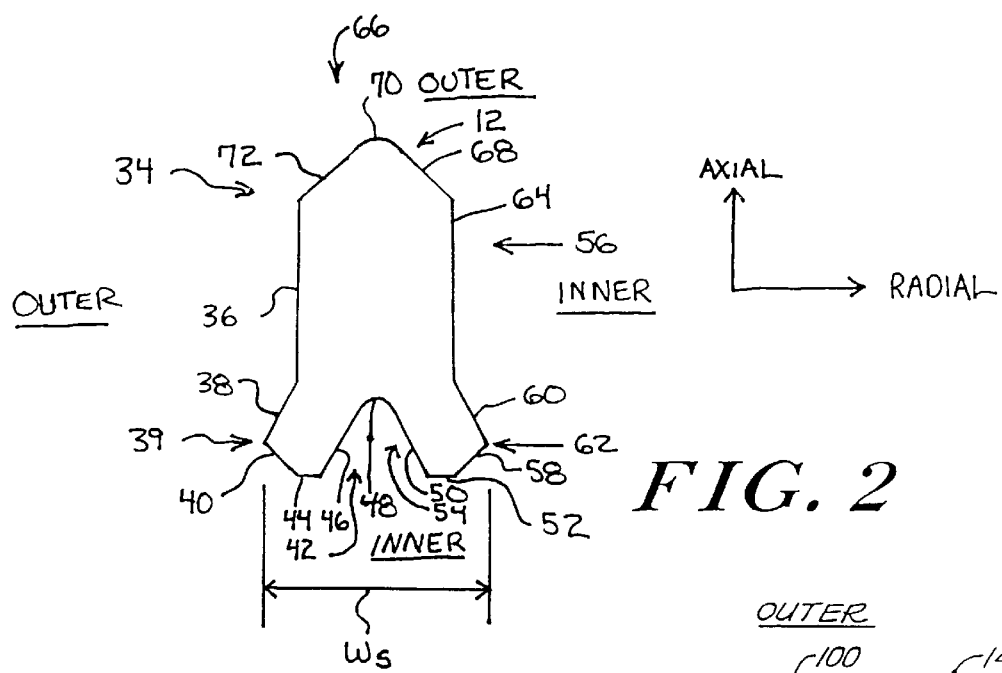
FIG. 2 is a cross-sectional view of the first seal element of the dual seal assembly of FIG. 1 according to the teachings of the present invention.

With reference to FIG. 2, the first seal element 12 includes an outer radial surface 34 having an axially extending section 36 connecting to an outer radially, outer axially facing arcuate angled section 38. The angled section 38 connects to a reverse facing, i.e., outer radially, inner axially facing, angled section 40. The angled sections 38 and 40 join to form an annular sealing edge 39 for establishing a fluid seal between the first seal element 12 and the axially extending surface 22 of the groove 16. The angled section 40 extends to an inner axial surface 42 that includes a radially extending flat section 44 extending to an inner radially, inner axially facing angled section 46. The angled section 46 connects to an inner axially facing arcuate section 48 that in turn extends to an outer radially, inner axially facing angled section 50. The angled section 50 extends to an radially extending flat section 52. The combination of the sections 46, 48, and 50 forms a groove 54 in the inner axial surface 42.

The first seal element 12 further includes an inner radial surface 56 formed by an inner radially, inner axially facing angled section 58 extending to an inner radially, outer axially facing arcuate angled section 60. The angled sections 58 and 60 join to provide an annular sealing edge 62 that surrounds the rod 28 to provide sealing engagement with the rod 28. The inner radial surface 56 further includes an axially extending section 64 extending from the angled section 60 to an outer axial surface 66. The outer axial surface 66 includes an angled section 68 extending to a substantially flat section 70 that in turn connects to an angled section 72.

Referring to FIGS. 1 and 2, the first seal element 12 provides fluid sealing between the gland 20 and the rod 28 by circumferentially contacting the rod with the annular sealing edge 62, and by a contact between a portion of the axially extending surface 22 of the groove 16 and at least a portion of the outer radial surface 34. The contact of the seal element 12 with the rod 28 provides a dynamic sealing interface with the rod 28, and the contact of the seal element 12 with the outer radial surface 22 of the groove 16 provides a static sealing interface between the seal element 12 and the groove 16.

Figure 3:
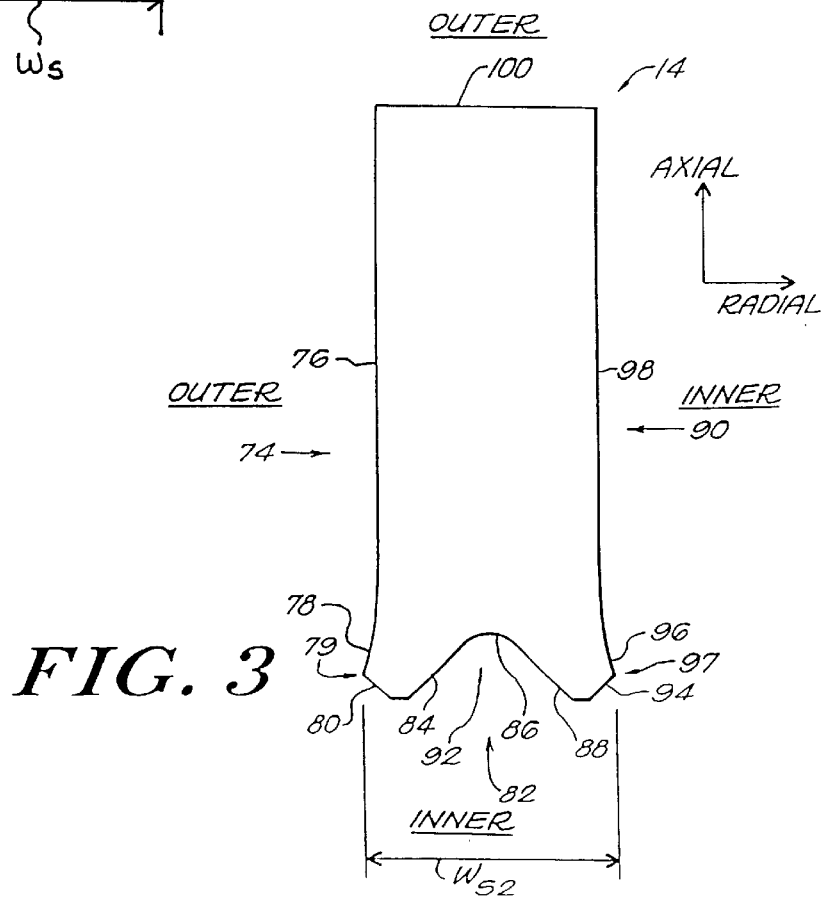
FIG. 3 is a cross-sectional view of the second seal element of the dual seal assembly of FIG. 1 according to the teachings of the present invention.

As illustrated in FIG. 3, the second seal element 14 includes an outer radial surface 74 having an axially extending section 76 extending to an outer radially, outer axially facing arcuate angled section 78 that in turn connects to an outer radially, inner axially facing angled section 80. The angled sections 78 and 80 join to form an annular sealing edge 79 for establishing a fluid seal between the second seal element 14 and the axially extending surface 22 of the groove 16. The angled section 80 joins with an inner axial surface 82 that includes an inner radially, inner axially facing angled section 84 extending to an inner axially facing arcuate section 86. The arcuate section 86 extends to an inner axially, outer radially facing angled section 88 that extends to an inner radial surface 90. The sections 84, 86, and 88 form an interface groove 92 in the surface 82 that is complementary in shape with the outer axial surface 66 of the seal element 12. The inner radial surface 90 includes an inner axially, inner radially facing angled section 94 extending to an outer radially, outer axially facing arcuate section 96. The angled sections 94 and 96 join to form annular sealing edge 97 that surrounds the rod 28 to provide sealing engagement with the rod 28. The inner radial surface 90 further includes an axially extending section 98 that connects with a radially extending, outer axial surface 100.

The first and second seal elements 12 and 14 can be formed from an elastomeric material such as, for example, neoprene, polyurethane, rubber, reinforced rubber, plastic, or perfluorinated polymer materials, such as TEFLON® copolymers (sold by DuPont, Wilmington, Del.). Preferably, the first and second seal elements 12 and 14 are constructed from a homogeneous elastomeric material to provide predictable elastic performance and eliminate wear debris that is common when a non-homogeneous or composite material is employed in a seal element. In one preferred embodiment, the first and second seal elements 12 and 14 can be both constructed from polyurethane materials having different hardness values.

The first and second seal elements 12 and 14 are preferably constructed from materials having different hardness or durometer hardness values. In particular, the material employed to manufacture the first seal element 12 preferably has a lower durometer value than the material employed to manufacture the second seal element 14.

The durometer value of the material forming the first seal element 12 is preferably between about 50 Shore A and about 95 Shore A, whereas the durometer hardness of the second seal element 14 is preferably between about 50 Shore A and about 25 Shore D. In one preferred embodiment, the durometer value of the material forming the first seal element 12 is 85 Shore A and the durometer value of the material forming the second seal element 14 is 95 Shore A.

The difference in hardness of the materials forming the first and second seal elements 12 and 14 provides a number of advantages. In particular, by varying the hardness of the materials forming the seal elements, the first seal element 12 and the second seal element 14 can be configured to provide different functions within the dual seal assembly 10 that cooperatively provide an effective fluid seal under a wide range of operating conditions. For example, the lower durometer hardness of the material forming the first seal element 12 allows increased elastic radial deflection of the first seal element 12 when the first seal element 12 is axially compressed by fluid pressure during operation, as described in greater detail below. The first seal element 12, thus, translates axial compressive forces into an increased radial sealing force by radially deflecting in the direction of the rod 28 and in the direction of the groove 28. Conversely, the increased durometer hardness of the second seal element 14 allows the second seal element 14 to resist elastic deformation during operation thereby maintaining the concentricity of the softer first seal element 12, inhibiting extrusion of the first element 12 into the clearance gap 33, and allowing the seal 10 to operate under reverse pressure conditions.

A further advantage of using a softer material for the first seal element 12 is that the softer material allows the first seal element 12 to better conform to the sealing surfaces, i.e. the outer surface of the rod 28 and axially extending surface 22 of the groove 16. A softer elastomeric material is, thus, particularly useful for providing fluid-tight seals in older equipment in which the sealing surfaces may not be smooth as a result of wear.

FIG. 1 shows the first and second seal elements 12 and 14 during static operating conditions. The term "static operating conditions" refers to operating conditions in which the rod 28 is at rest, i.e. operating conditions in which the rod 28 does not reciprocate relative to the gland 20. During static operating conditions, the annular sealing edge 39 and the annular sealing edge 62 of the first seal element 12 contact the axially extending surface 22 of the groove 16 and the outer surface of the rod 28 to provide a fluid seal between the gland 20 and the rod 28. The width of the first seal element 12 between the sealing edges 39 and 62, as indicated by arrow $W_s$ in FIG. 2, in an undeformed state is preferably selected to be greater than the distance between the axially extending surface 22 of the groove 16 and the outer surface of the rod 28, as indicated by the line $W_G$ in FIG. 1. The first seal element 12 is thus radially compressed at the seal edges 39 and 62 to provide an elastic radially outer sealing force $F_{ro}$ at seal edge 39 and an elastic radially inner sealing force $F_{ri}$ at seal edge 62. The radial sealing forces $F_{ro}$ and $F_{ri}$ cooperate to provide a fluid seal between the gland 20 and the rod 28 by forcing the sealing edges 39 and 62 into engagement with the rod 28 and the gland 20. In this manner, the dual seal assembly 10 of the present invention provides a fluid tight seal during static operating conditions.

Additionally, during static operating conditions the annular sealing edge 79 and the annular sealing edge 97 of the second seal element 14 contact the axially extending surface 22 of the groove 16 and the outer surface of the rod 28, respectively, to provide a secondary fluid seal between the gland 20 and the rod 28. As in the case of the first seal element 12, the width of the second seal element 14 between the sealing edges 79 and 97, as indicated by arrow $W_{s2}$ in FIG. 3, is preferably selected to be greater than the distance between the axially extending surface 22 of the groove 16 and the outer surface of the rod 28, as indicated by the line $W_G$ in FIG. 1. The second seal element 14 is thus radially compressed at the seal edges 79 and 97 to provide an elastic radially outer sealing force $F_{ro2}$ at seal edge 79 and an elastic radially inner sealing force $F_{ri2}$ at seal edge 97. The radial sealing forces $F_{ro2}$ and $F_{ri2}$ cooperate to provide a secondary fluid seal between the gland 20 and the rod 28 by forcing the sealing edges 79 and 97 into engagement with the gland 28 and the rod 20.

It is preferable for the width $W_s$ of the first seal element 12 to be greater than the width $Ws_2$ of the second seal element 14. Consequently, the radial sealing forces $F_{ri}$ and $F_{ro}$ provided by the first seal element 12 are preferably greater than the radial sealing forces $F_{ri2}$ and $F_{ro2}$ provided by the second seal element 14. Accordingly, the first seal element 12 provides the primary fluid seal for the dual seal array 10 of the present invention during static operating conditions.

Preferably, the axial length of the first and second seal elements 12 and 14, as indicated by the line $L_S$ in FIG. 1, is less than the length of the axially extending surface 22 of the groove 16, as indicated by the line $L_G$ in FIG. 1. An annular inner chamber 23 is provided between the inner axial surface 42 of the first seal element 12 and the radial side wall 24 of the groove 16. The annular inner chamber 23 permits the first and second seal elements 12 and 14 to float or slide axially within the groove 16 in response to changing operating condition, as discussed in greater detail below. The presence of the inner annular chamber 23 also obviates the need for tight tolerances between the groove and the seal elements, thus providing fault tolerant installation that minimizes the training required by personnel.

Conventional seal utilize numerous elastomeric seal rings that are axially compressed into the annular groove of the gland to provide a fluid seal between the gland and the rod. As the seal rings wear, additional axial pressure is applied to the seal rings to maintain the integrity of the seal. This is typically achieved through use of a clamp ring or by forcing shims into the groove to further compress the seal rings into radial contact with the rod. In contrast, the dual seal 10 of the present invention requires only two seal elements, the first and second seal elements 12 and 14, to establish a seal, and is thus more economical than convention seal. Moreover, the first and second seal elements 12 and 14 are configured to float or slide axially with the groove 16 and hence do not require frequent adjustment, i.e., axial compression, to maintain an effective seal.

Figure 4:
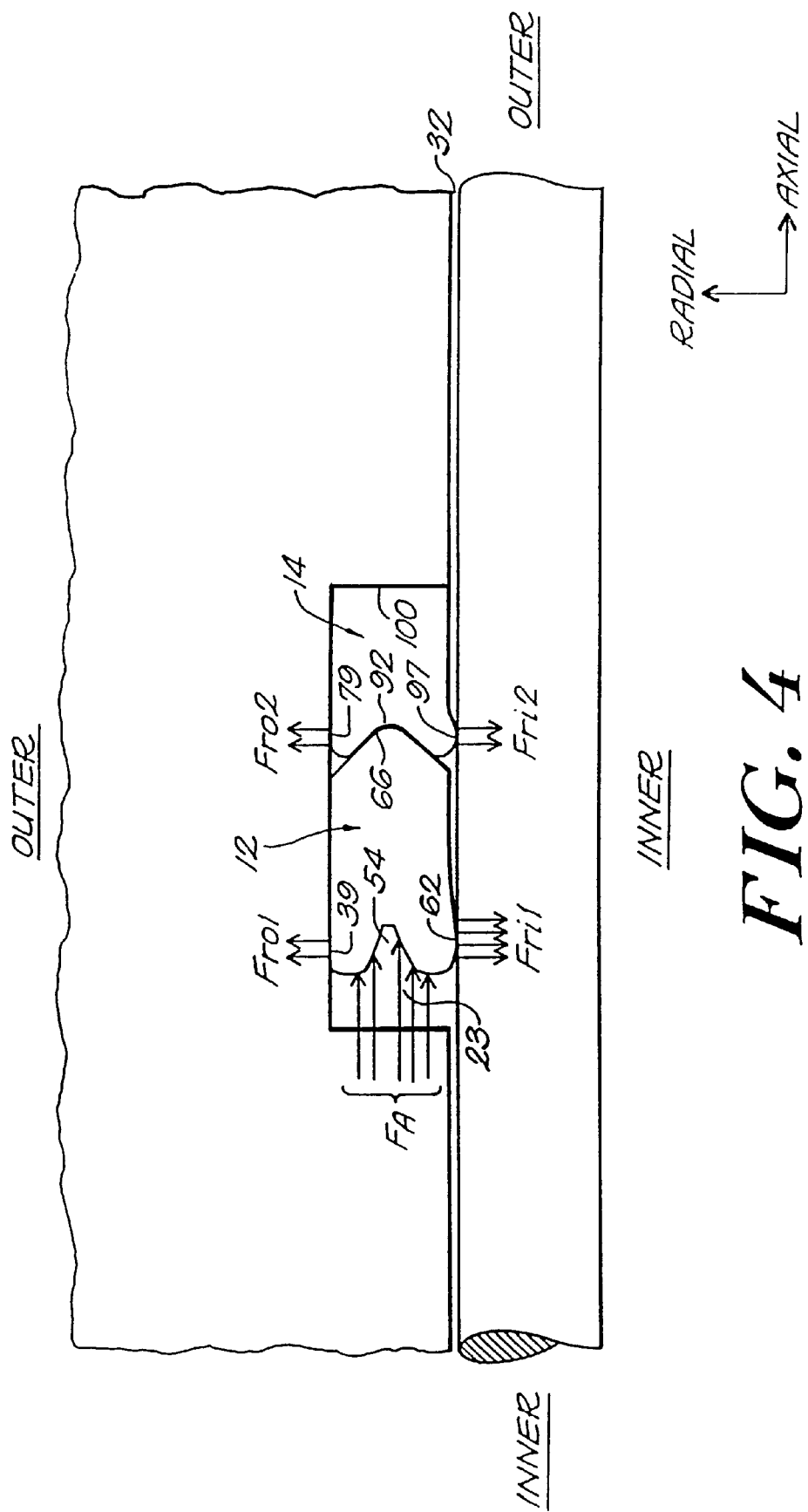
FIG. 4 is a side elevational view in cross-section of the dual seal assembly of FIG. 1, illustrating the dual seal assembly under normal operating conditions.

FIG. 4 illustrates the dual seal assembly 10 of the invention during normal operating conditions. Normal operating conditions refer to operating conditions in which the rod 28 reciprocates relative to the gland 20 and in which the fluid pressure at the axial inner end of the dual seal assembly 10 is greater than the pressure at the axial outer end of the dual seal assembly 10. Under normal operating conditions, hydraulic or pneumatic fluid fills inner annular chamber 23 and fluid from an external environment, such as air, fills clearance gap 32. The fluid pressure difference between the hydraulic or pneumatic fluid within the inner annular chamber 23 and the environmental fluid within the clearance gap 32, results in a net fluid force in the axially outward direction on the first seal element 12, as indicated by the arrows $F_A$ in FIG. 4. The axial fluid force $F_A$ is transmitted to the second seal element 14 through the interface formed by the axial outer surface 66 of the first seal element and the interface groove 92 of the second seal element 14. As a result of the axial Force $F_A$, the first and second seal elements 12 and 14 are axially compressed against the radial side wall 26 of the groove 16.

The first seal element 12 translates the axial compressive force $F_A$ into two radial sealing forces, indicated by arrows $F_{ro1}$ and $F_{ri1}$ in FIG. 4, by radially deflecting at the seal edges 39 and 62 in the direction of the axially extending wall 22 of the groove 16 and the rod 28, respectively. The groove 54 formed in the axially inner surface 42 of the first seal element 12 facilitates the deflection of the first seal elements at the seal edges 39 and 62. As discussed above, the first seal element 12 is preferably constructed of an elastomeric material having a lower durometer hardness than the durometer hardness of the elastomeric material forming the second seal element 14. The lower durometer hardness and, therefore lower modulus of elasticity, of the material forming the first seal element 12 allows increased elastic radial deflection of the first seal element 12 as the first seal element 12 is axially compressed by fluid pressure during normal operation.

The axial compressive force $F_A$ transmitted to the second seal element 14 through the first seal element 12 results in translation the axial compressive force $F_A$ into two radial sealing forces, indicated by arrows $F_{ro2}$ and $F_{ri2}$ in FIG. 4, in a manner analogous to the first seal element 12. The second seal element 14 radially deflects at the seal edges 79 and 97 in the direction of the axially extending wall 22 of the groove 16 and the rod 28, respectively. Because of the preferably increased durometer hardness of the material forming the second seal element 14, the amount of radial deflection, and consequently the strength of the radial sealing forces, $F_{ro2}$ and $F_{ri2}$, is less than the radial sealing forces $F_{ro1}$ and $F_{ri1}$, associated with the first seal element 12. Thus, the first seal element 12 provides the primary seal for the dual seal assembly 10 and the second seal element 14 provides secondary sealing.

In conventional seal assemblies, axial forces on the seal elements can result in the extrusion of portions of the seal elements into the clearance gap between the gland and the rod, resulting in fluid leakage. By increasing the durometer hardness of the material forming the second seal element 14, the second seal element 14 operates to resist or inhibit extrusion of both the first and second seal elements 12 and 14 into the clearance gap 32 between the gland 20.

During the normal operation of the equipment, a thin film of fluid is typically present on the seal edges 62 and 97 of the seal elements 12 and 14, respectively. This fluid film provides lubrication of the seal edges 62 and 97 that maintains smooth reciprocating movement of the rod 28, and also minimizes the wear of the equipment. Thus, the seal assembly 10 having two seal elements, each of which provides a distinctively different function, provides an effective fluid-tight seal from an atmospheric pressure to pressure in excess of 5000 psi.

Figure 5:
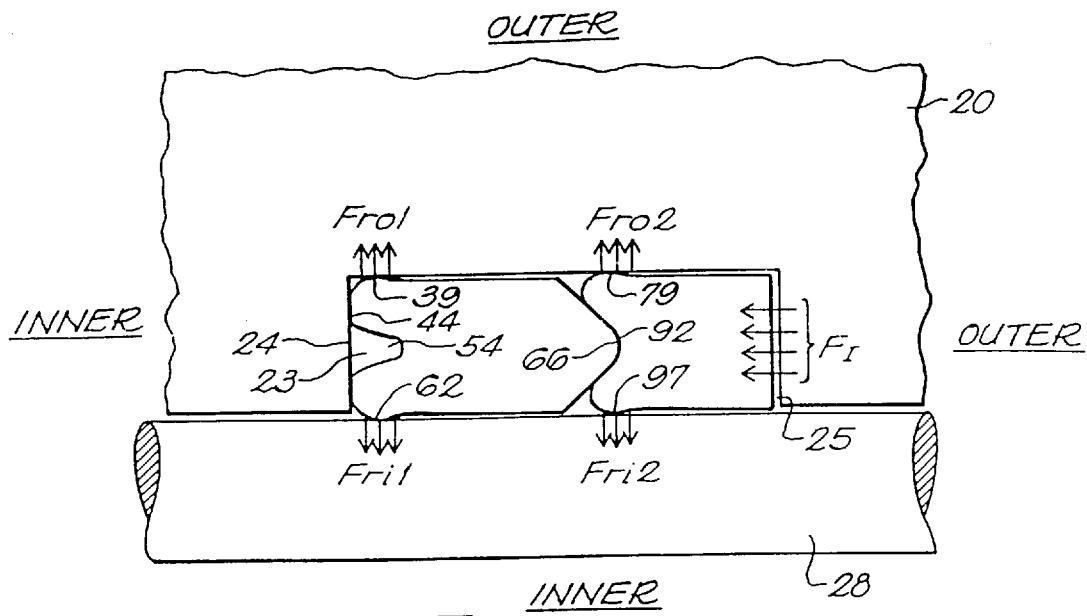
FIG. 5 is a side elevational view in cross-section of the dual seal assembly of FIG. 1, illustrating the dual seal assembly under pressure-reversal conditions.

The dual seal assembly 10 of the present invention provides fluid-tight sealing under a wide range of operating conditions, including under pressure-reversal conditions. FIG. 5 illustrates the operation of the dual seal assembly 10 under pressure reversal conditions. Pressure-reversal conditions refer to conditions in which the pressure on the normally high-pressure side of the dual seal assembly, i.e. the axial inner side, drops below the pressure on the normally low-pressure side of the seal assembly, i.e. the axially outer side.

During pressure-reversal conditions, the hydraulic or pneumatic fluid filling inner annular chamber 23 is at a pressure less than the pressure of the external fluid at the axially outer surface 100 of the second seal element 14. The fluid pressure differential between the hydraulic or pneumatic fluid within the inner annular chamber 23 and the environmental fluid results in a net fluid force in the axially inward direction on the second seal element 14, as indicated by the arrows $F_I$ in FIG. 5. The axial fluid force $F_I$ is transmitted to the first seal element 12 through the interface formed by the axial outer surface 66 of the first seal element 12 and the interface groove 92 of the second seal element 14. As a result of the axial Force $F_I$, the first and second seal elements 12 and 14 slide axially within the groove 16 until the axially inner walls 44 and 52 of the first seal element 12 abuts the radial side wall 24 of the groove 16. Once the axially inner walls 44 and 52 abut the radial side wall 24 of the groove 16, the axial force $F_I$ begins compressing the first seal element 12 and the second seal element 14.

In a manner analogous to that described above in connection with the normal operation condition, the first and second seal elements 12 and 14 translate the axial compressive force $F_I$ into radial sealing forces, indicated by arrows $F_{ro1}, F_{ri1}, F_{ro2}, F_{ri2}$ in FIG. 5, by radially deflecting at the seal edges 39, 79 and 62, 79 in the direction of the axially extending wall 22 of the groove 16 and the rod 28, respectively. As in the case of the normal operating condition, the softer first seal element 12 provides greater radial sealing forces and, thus, provides the primary seal for the dual seal assembly 10.

Under pressure-reversal conditions, the net pressure between the hydraulic or pneumatic fluid and the external fluid is minimal compared to the magnitude of the net pressure difference during normal operating conditions. Typically, the net pressure difference during pressure-reversal conditions is in the order of 15 psi, compared to net pressure differences in the order of 1000–5000 psi for normal operating conditions. For this reason, extrusion of the first seal element 12 into the clearance gap 33 during pressure-reversal conditions is not a significant concern. Accordingly, the flat surfaces provided by the axially inner surfaces 44 and 57 of first seal element 12 which abut the axial side wall 24 of the groove 16 are sufficient to inhibit extrusion of the first seal element 12 into the clearance gap 33.

Figure 6:
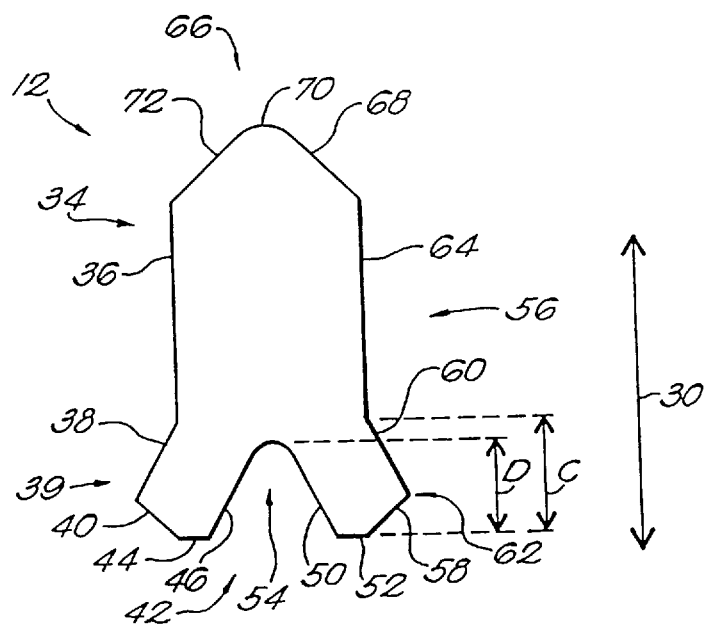
FIG. 6 is a cross-sectional view of the first seal element of the dual seal assembly of FIG. 1, illustrating the relative dimensions of the seal edge and the groove formed in the axially inner surface of the first seal element.

In a preferred embodiment, the axial length of the groove 54 formed in the axially inner surface 42 of the first seal element 12, indicated by line D in FIG. 6, is selected to permit radial deflection of the first seal element 12 at the seal edges 39 and 62 when the first seal element 12 is axially compressed. As discussed above, the radial deflection of the first seal element 12 results in increased radial sealing forces at the seal edges 39 and 62 to provide enhanced fluid sealing against the axially extending surface 22 of the groove 16 and the rod 28, respectively. It is important, however, to limit the magnitude of the resultant radial sealing forces provided by the first seal element 12 to prevent premature wearing of the seal element. For example, if the radial sealing forces become too high, the resultant frictional forces between the seal edge 62 and the rod 28 can cause portions of the first seal element 12 to be sheared off.

To inhibit the premature wearing of the seal elements, it is preferable for the axial length D of the groove 54 to satisfy the following relationship, $$(C-D)/D \leq 0.25, \quad (1)$$

where C is the axial length of the seal edge 62, as illustrated in FIG. 6. The relationship thus established by formula (1) between the length D of groove 54 and the length C of the seal edge 62, permits sufficient radial deflection of the first seal element 12 to provided fluid sealing at the seal edges 39 and 62 while concomitantly inhibiting increased frictional forces from developing between the seal edge 62 and the rod 28 that can lead to premature wearing of the first seal element 12.

In a preferred embodiment of the invention, the first and second seal elements 12 and 14 can be split to facilitate installation, replacement, monitoring or inspection of the dual seal assembly 10. In particular, the installation, replacement, and inspection of the split seal elements 12 and 14 of the dual seal assembly 10 can be performed without necessitating the complete breakdown of the hydraulic and pneumatic system and without having to pass the seal elements over an end of the rod 28.

Figure 7A:
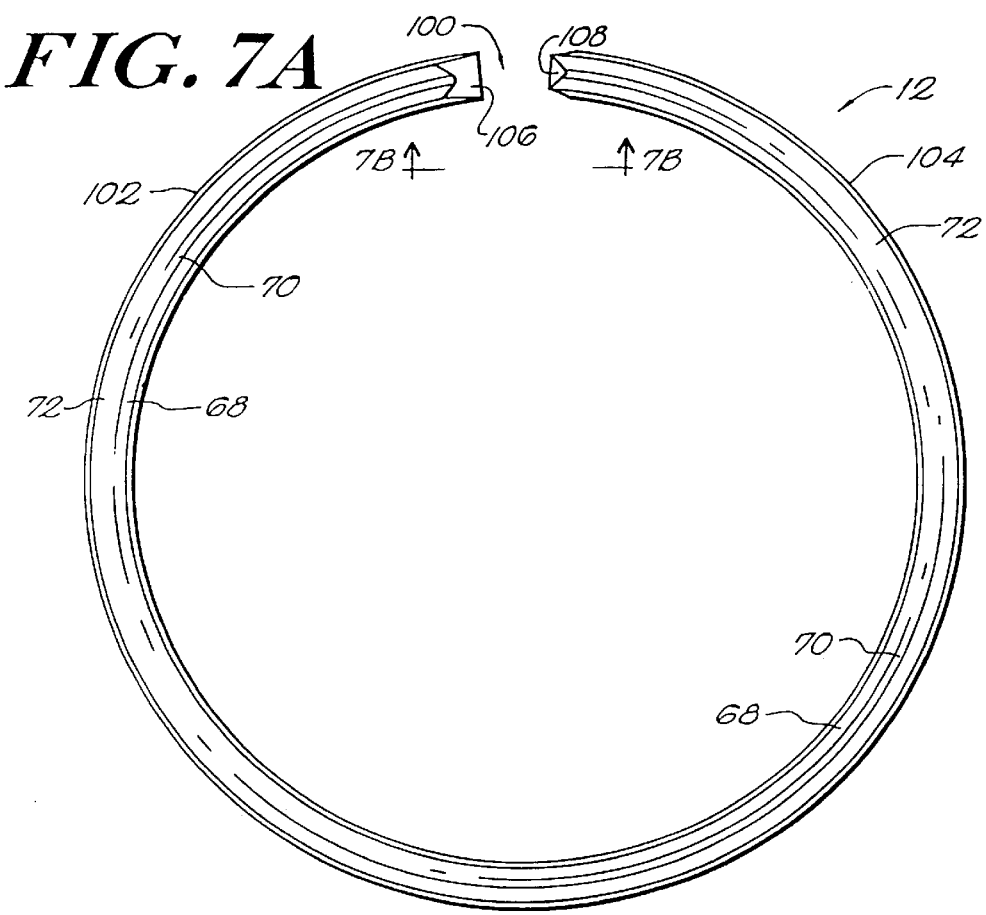
FIG. 7A is an elevational view of the axially outer surface of the first seal element of a split dual seal assembly according to the teachings of the present invention.
Figure 7B:
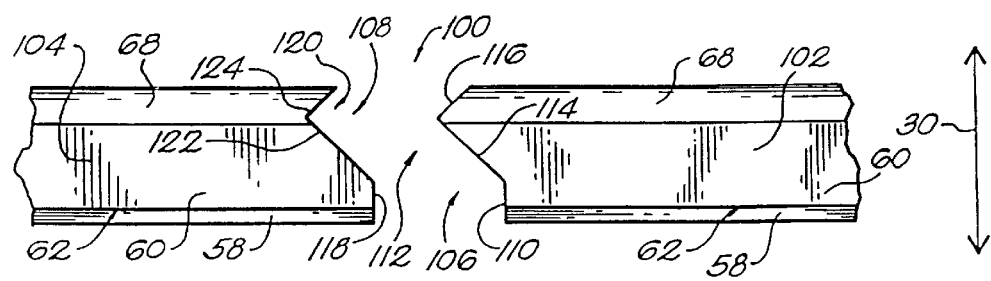
FIG. 7B is an elevational view of the radially inner surface of the first seal element of FIG. 7A, illustrating the interconnecting edges forming the split interface of the first seal element.
Figure 7C:
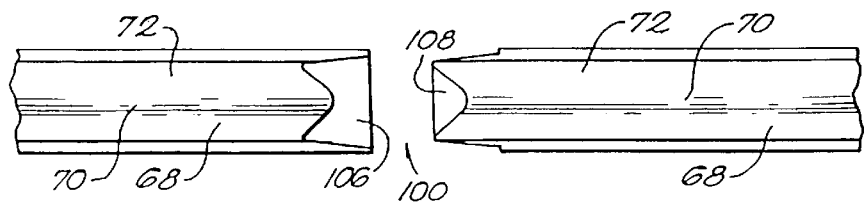
FIG. 7C is a detailed elevational view of the interconnecting edges forming the split interface of the first seal element of FIG. 7A.

Referring to FIGS. 7A–7C, a split first seal element 16 is shown. The first seal element 12 is split at interface 100 to form arcuate seal segments 102 and 104 that connect at the interface 100 through complementary, mating interconnecting edges 106 and 108. The first and second interconnecting edges 106 and 108 have a generally non-planar or non-linear design to promote the interlocking of the seal segments 106 and 108 when assembled. The first interconnect edge 106 includes a generally planar, axially extending surface 110 and a protruding non-planar section 112 formed by first and second angled surfaces 114 and 116. The second interconnect edge 108 includes a generally planar, axially extending surface 118 and a recessed non-planar section 120 complementary in shape to the protruding non-planar section 112 of the first interconnect edge 106. The recessed non-planar section 120 of the second interconnect edge 108 is formed by first and second angled surfaces 122 and 124. Although not illustrated, the second seal element 14 can be split in a manner analogous to the first seal element 12.

Alternatively, the arcuate seal segments 102 and 104 can be split at a second interface to allow the seal segments 102 and 104 to be completely separated into separate seal segments. One skilled in the art will further appreciate that the seal element can also be split at additional points, e.g., at three or more interfaces, to form a plurality of interconnecting arcuate seal segments.

It is important for the first and second interconnect edges 106 and 108 to maintain contact proximate the seal edge 62 to prevent leakage of fluid between the first seal element 12 and the rod 28. The first and second interconnect edges 106 and 108 are thus configured in the interlocking arrangement to maintain a fluid tight connection at the interface 100 proximate the seal edge 62 during operation to inhibit fluid leakage. In particular, the non-planar sections 112 and 120 of the first and second interconnect edges 106 and 108 cooperate to inhibit the separation of the planar surfaces 110 and 118 of the first and second interconnect edges 106 and 108.

Figure 8A:
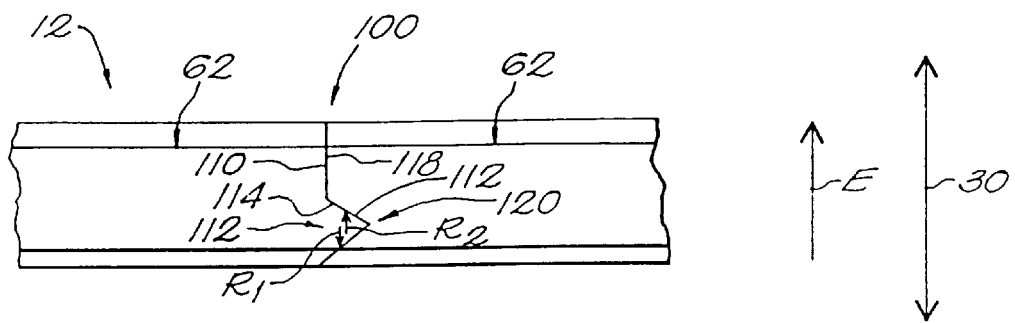
FIG. 8A is an elevational view of the radially inner surface of the first seal element of FIG. 7A, illustrating the interconnecting edges forming the split interface of the first seal element during motion of the rod in the axially outward direction.
Figure 8B:
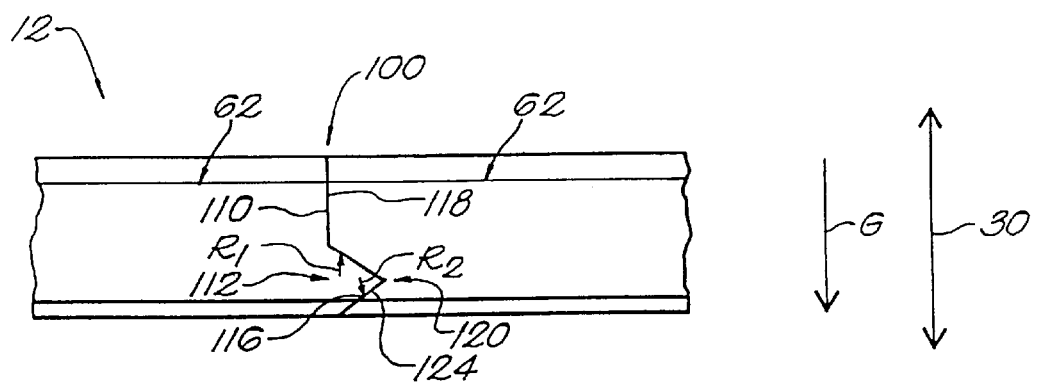
FIG. 8B is an elevational view of the radially inner surface of the first seal element of FIG. 7A, illustrating the interconnecting edges forming the split interface of the first seal element during motion of the rod in the axially inward direction.

The cooperating effect of the non-planar sections 112 and 120 of the first and second interconnect edges 106 and 108 is illustrated by FIGS. 8A and 8B. FIG. 8A illustrates motion of the rod 28 in the axially outer direction, as indicated by arrow E, and the resultant forces on the first seal element 12, as indicated by arrows $R_1$ and $R_2$, at the interface 100. The first angled surfaces 114 and 122 of the non-planar sections 112 and 120, respectively, cooperate to inhibit relative axial motion of the planar surfaces 110 and 118 of the first and second interconnect edges 106 and 108 due to the resultant forces $R_1$ and $R_2$. Accordingly, separation of the planar surfaces 110 and 118, and the resulting fluid leakage, is inhibited.

FIG. 8B illustrates motion of the rod 28 in the axially inner direction, as indicated by arrow G, and the resultant forces on the first seal element 12, as indicated by arrows $R_1$ and $R_2$, at the interface 100. The second angled surfaces 116 and 124 of the non-planar sections 112 and 120, respectively, cooperate to inhibit relative axial motion of the planar surfaces 110 and 118 of the first and second interconnect edges 106 and 108 due to the resultant forces $R_1$ and $R_2$. Accordingly, separation of the planar surfaces 110 and 118, and the resulting fluid leakage, is inhibited.

While the exemplary embodiment of the dual seal assembly 10 of the present invention is described above in connection with a reciprocating rod, one skilled in the art will recognize that the dual seal assembly 10 can be used in alternative applications, including, for example, to provide fluid sealing about a rotating shaft.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. A dual seal for providing a seal between a rod and a gland, the rod extending along a longitudinal axis, the dual seal comprising:

a first annular seal element constructed of a material having a first hardness and having a seal edge contacting the rod to provide a seal between the first seal element and the rod and a radially opposed second seal edge, said first and second seal edges being separated by a groove formed in a radially extending surface of the seal element, wherein the groove extends axially to a depth D and the first seal edge has an axial length C, whereby the relationship between the groove depth D and the axial length C of the first seal edge is $(C-D)/D \leq 0.25$, and a second annular seal element positioned axially adjacent the first annular seal element, the second annular seal element being constructed of a material having a second hardness different from the first hardness and having a seal edge contacting the rod to provide a seal between the second seal element and the rod, wherein at least a portion of one of the first annular seal element and the second annular seal element engages the gland to form the seal between the rod and the gland.

2. The dual seal of claim 1, wherein the first annular seal element is positioned axially inwardly from the second annular seal element and wherein the hardness of the material forming the first annular seal element is less than the hardness of the material forming the second annular seal element.

3. The dual seal of claim 1, wherein the hardness of the material forming the second annular seal element is between about 50 Shore A and about 25 Shore D.

4. The dual seal of claim 3, wherein the hardness of the material forming the second annular seal element is about 95 Shore A.

5. The dual seal of claim 3, wherein the hardness of the material forming the first annular seal element is approximately between 50 Shore A and 95 Shore A.

6. The dual seal of claim 5, wherein the hardness of the material forming the first annular seal element is about 85 Shore A.

7. The dual seal of claim 1, wherein the first annular seal element is split.

8. The dual seal of claim 7, wherein the second annular seal element is split.

9. The dual seal of claim 1, wherein the first and second annular seal elements are formed from an elastomeric material.

10. The dual seal of claim 1, wherein the first seal edge of the first annular seal element has a first seal edge for engaging the rod, the first seal edge being is formed by first and second intersecting surfaces, at least one of the first and second intersecting surfaces being oriented at an angle relative to the longitudinal axis of the rod.

11. The dual seal of claim 10, wherein the second seal edge of the first annular seal element has a second seal edge for engaging the gland, the second seal edge being is formed by third and fourth intersecting surfaces, at least one of the third and fourth surfaces being oriented at an angle relative to the longitudinal axis of the rod.

12. The dual seal of claim 11, wherein the second annular seal element has a third seal edge for engaging the rod and a fourth seal edge radially opposed to the third seal edge for engaging the gland, the third seal edge and the fourth seal edge each being formed by a pair of intersecting surfaces, at least one of the intersecting surfaces of each pair of intersecting surfaces being oriented at an angle relative to the longitudinal axis of the rod.

13. The dual seal of claim 12 wherein the third seal edge and the fourth seal edge are separated by an interface groove formed in a radially extending surface of the second annular seal element, the interface groove being sized and shaped to receive a portion of the first annular seal element.

14. The dual seal of claim 1, wherein the first and second annular seal elements connect at an interface, the second seal annular element having a generally radially extending surface opposite the interface for engagement with the gland during normal operation.

15. The dual seal of claim 1, wherein the material forming the first annular seal element and the material forming the second annular seal element are the same material having different hardness values.

16. The dual seal of claim 15, wherein the material forming the first annular seal element and the material forming the second annular seal element is polyurethane.

17. A dual seal for providing a seal between a rod and a gland, the rod extending along a longitudinal axis, and the gland having an annular groove formed therein, the groove being defined by first and second radially extending side walls spaced apart by an axially extending surface, the dual seal comprising:

a first annular seal element constructed of a material having a first hardness and having a first seal edge for engaging the rod to form a seal, the first seal edge being formed by first and second intersecting surfaces that are oriented at an angle relative to the longitudinal axis of the rod, a first radially extending flat surface extending from the second intersecting surface and substantially parallel to one of said radially extending side walls of the groove, a second seal edge radially opposed to the first seal edge for engaging the gland, the second seal edge being formed by third and fourth intersecting surfaces that are oriented at an angle relative to the longitudinal axis of the rod, and a second radially extending flat surface extending from the fourth intersecting surface and substantially parallel to one of said radially extending side wall of the groove, and a second annular seal element positioned axially adjacent the first annular seal element, the second annular seal element being constructed of a material having a second hardness different from the first hardness and having a first seal edge for engaging the rod to form a seal, the first seal edge being formed by first and second intersecting surfaces that are oriented at an angle relative to the longitudinal axis of the rod, and a second seal edge radially opposed to the first seal edge for engaging the gland, the second seal edge being formed by third and fourth intersecting surfaces that are oriented at an angle relative to the longitudinal axis of the rod.

18. The dual seal of claim 17, wherein the first annular seal element is positioned axially inwardly from the second annular seal element and wherein the hardness of the material forming the first annular seal element is less than the hardness of the material forming the second annular seal element.

19. The dual seal of claim 17, wherein the hardness of the material forming the second annular seal element is between about 50 Shore A and about 25 Shore D.

20. The dual seal of claim 19, wherein the hardness of the material forming the second annular seal element is about 95 Shore A.

21. The dual seal of claim 19, wherein the hardness of the material forming the first annular seal element is approximately between 50 Shore A and 95 Shore A.

22. The dual seal of claim 21, wherein the hardness of the material forming the first annular seal element is about 85 Shore A.

23. The dual seal of claim 17, wherein the first annular seal element is split.

24. The dual seal of claim 23, wherein the second annular seal element is split.

25. The dual seal of claim 17, wherein the first and second annular seal elements are formed from an elastomeric material.

26. The dual seal of claim 17, wherein the first seal edge and the second seal edge are radially opposed and are separated by a groove formed in a radially extending surface of the first annular seal element.

27. The dual seal of claim 26, wherein the groove extends axially to a depth D and the first seal edge has an axially length C, whereby the relationship between the groove depth D and the axial length C of the first seal edge is $(C-D)/D \leq 0.25$.

28. The dual seal of claim 17, wherein the material forming the first annular seal element and the material forming the second annular seal element is polyurethane.

* * * * *

UNITED STATES PATENT AND TRADEMARK OFFICE
CERTIFICATE OF CORRECTION

PATENT NO. : 6,386,548 B1
DATED : May 14, 2002
INVENTOR(S) : Michael Grimanis et al.

It is certified that error appears in the above-identified patent and that said Letters Patent is hereby corrected as shown below:

Column 11,
Line 46, insert -- first -- before "seal".

Column 13,
Line 15, replace "wall" with -- walls --.

Signed and Sealed this

Thirteenth Day of May, 2003

JAMES E. ROGAN
*Director of the United States Patent and Trademark Office*